United States Patent
Sugiyama et al.

(10) Patent No.: US 7,928,958 B2
(45) Date of Patent: Apr. 19, 2011

(54) PERIPHERAL DEVICE CONTROL APPARATUS

(75) Inventors: Tadashi Sugiyama, Shizuoka-ken (JP);
Toshifumi Oba, Shizuoka-ken (JP);
Tatsuya Fukuyama, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 828 days.

(21) Appl. No.: 11/116,047

(22) Filed: Apr. 27, 2005

(65) Prior Publication Data

US 2005/0243057 A1 Nov. 3, 2005

(30) Foreign Application Priority Data

Apr. 28, 2004 (JP) ................. 2004-134657

(51) Int. Cl.
*G09G 5/00* (2006.01)
(52) U.S. Cl. ............... 345/156; 348/14.05; 348/734; 340/825.22
(58) Field of Classification Search ............... 348/14.05, 348/734; 345/156; 340/825.22, 825.24, 340/825.69, 825.72
See application file for complete search history.

(56) References Cited

U.S. PATENT DOCUMENTS

| | | | | |
|---|---|---|---|---|
| 4,509,211 A | * | 4/1985 | Robbins | 398/126 |
| 5,418,527 A | * | 5/1995 | Yashiro | 340/825.24 |
| 6,781,518 B1 | * | 8/2004 | Hayes et al. | 340/825.72 |
| 6,859,197 B2 | * | 2/2005 | Klein et al. | 345/158 |
| 7,046,161 B2 | * | 5/2006 | Hayes | 340/825.69 |
| 7,053,811 B2 | * | 5/2006 | Aratani et al. | 341/173 |
| 7,119,710 B2 | * | 10/2006 | Hayes et al. | 340/825.72 |
| 2004/0095317 A1 | * | 5/2004 | Zhang et al. | 345/158 |
| 2005/0052423 A1 | * | 3/2005 | Harris et al. | 345/169 |

FOREIGN PATENT DOCUMENTS

| | | |
|---|---|---|
| JP | 07-007771 | 10/1995 |
| JP | 07-264677 | 10/1995 |
| JP | 10-098780 | 4/1998 |
| JP | 10-322782 | 12/1998 |

* cited by examiner

*Primary Examiner* — Stephen G Sherman
(74) *Attorney, Agent, or Firm* — Harness, Dickey & Pierce, PLC

(57) ABSTRACT

Upon receipt of an IR code from a remote controller, a peripheral device control apparatus generates, on the basis of peripheral device control information acquired from a server, a code for causing a peripheral device, which is an object of remote control by the control apparatus, to perform an operation as instructed by the received IR code, and then the control apparatus outputs the generated code as an IR code via an infrared ray generation section. In this way, the peripheral device control apparatus can readily control any one of a plurality of types of peripheral devices, in response to a user just giving an operation signal to a single input section.

10 Claims, 11 Drawing Sheets

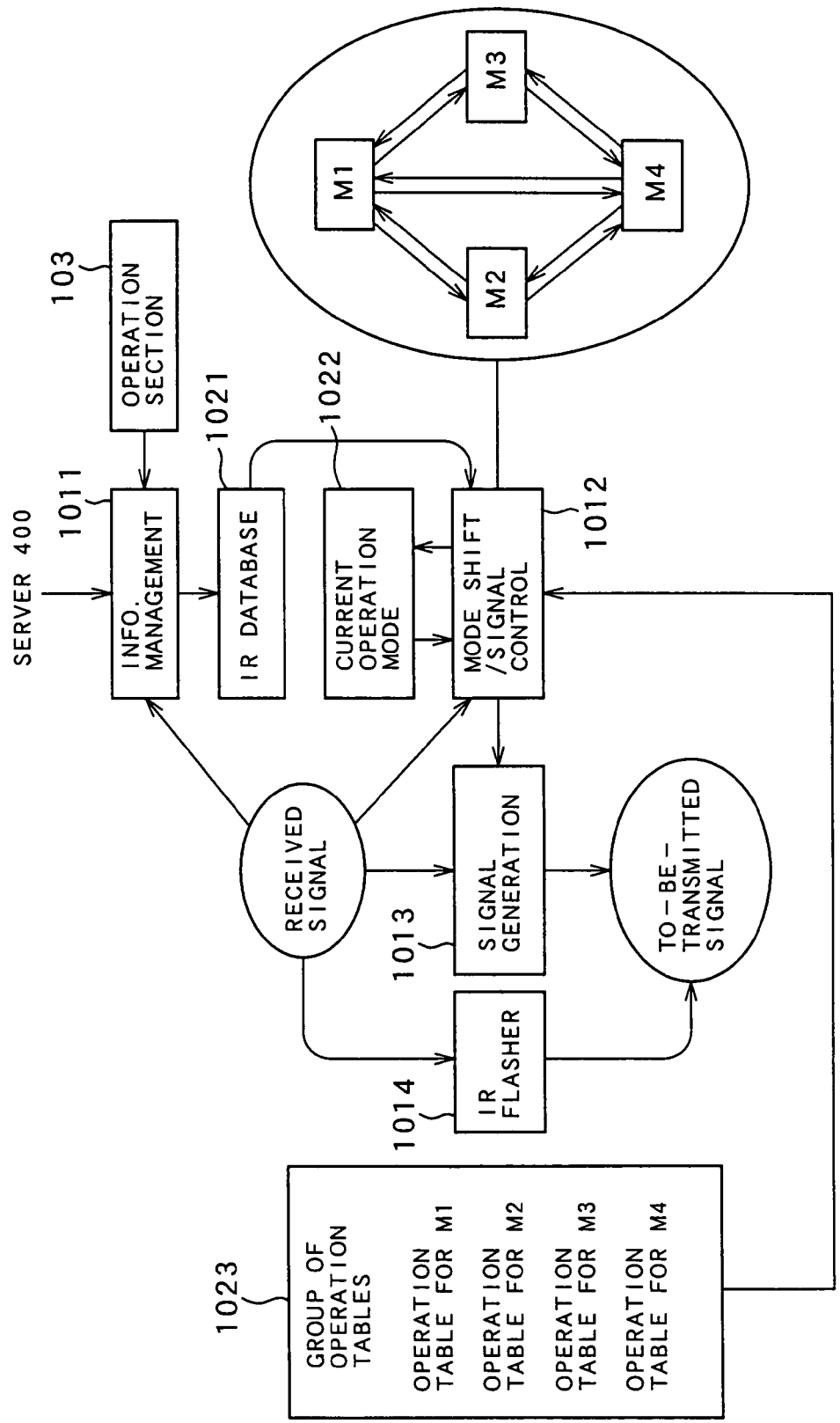
F I G. 5

FIG. 6

PERIPHERAL DEVICE CONTROL INFO.

AMP. INFO.
- COMPANY NAME
- MODEL NAME
- NUMBER OF INPUTS =6
- INPUT NAME
  - CD
  - DVD
  - ...
- REMOTE CONTROLLER IR CODE
  - FORMAT INFO.
  - POWER ON
  - POWER OFF
  - VOLUME +
  - VOLUME −
  - ...

DVD. INFO.
- COMPANY NAME
- MODEL NAME
- REMOTE CONTROLLER IR CODE
  - FORMAT INFO.
  - POWER ON
  - POWER OFF
  - SKIP +
  - SKIP −
  - ...

IR CODE FORMAT PARAMETERS
- PARAMETERS

FIG. 7

| GROUP OF OPERATION TABLES | | |
|---|---|---|
| OPERATION MODE | KEY OPERATION | OPERATION CONTENT |
| INPUT = TUNER | SKIP KEY | SELECT CHANNEL-SWITCHING R.C. IR CODE FROM AMONG PERIPHERAL DEVICE CONTROL INFO. FOR TUNER, AND TRANSMIT THE SELECTED IR CODE. |
| | VOLUME KEY | SELECT VOLUME-CONTROLLING R.C. IR CODE FROM AMONG PERIPHERAL DEVICE CONTROL INFO. FOR AMP., AND TRANSMIT THE SELECTED IR CODE. |
| | INPUT KEY | SELECT R.C. IR CODE FOR SWITCHING AMP. INPUT TO DVD FROM AMONG PERIPHERAL DEVICE CONTROL INFO. FOR AMP., AND TRANSMIT THE SELECTED IR CODE. STORE INPUT=DVD AS CURRENT OPERATION CODE. |
| INPUT = DVD | PLAY KEY | SELECT R.C. IR CODE CORRE. TO PLAY FROM AMONG PERIPHERAL DEVICE CONTROL INFO. FOR DVD, AND TRANSMIT THE SELECTED IR CODE. |
| | VOLUME KEY | SELECT VOLUME-CONTROLLING R.C. IR CODE FROM AMONG PERIPHERAL DEVICE CONTROL INFO. FOR AMP., AND TRANSMIT THE SELECTED IR CODE. |
| | INPUT KEY | SELECT R.C. IR CODE FOR SWITCHING AMP. INPUT TO CD FROM AMONG PERIPHERAL DEVICE CONTROL INFO., AND TRANSMIT THE SELECTED IR CODE. STORE INPUT=CD AS CURRENT OPERATION CODE. |
| INPUT = CD | PLAY KEY | SELECT R.C. IR CODE CORRE. TO PLAY FROM AMONG PERIPHERAL DEVICE CONTROL INFO. FOR CD, AND TRANSMIT THE SELECTED IR CODE. |
| | VOLUME KEY | SELECT VOLUME-CONTROLLING R.C. IR CODE FROM AMONG PERIPHERAL DEVICE CONTROL INFO. FOR AMP., AND TRANSMIT THE SELECTED IR CODE. |
| | VOLUME KEY | SELECT R.C. IR CODE FOR SWITCHING AMP. INPUT TO TUNER FROM AMONG PERIPHERAL DEVICE CONTROL INFO. FOR AMP., AND TRANSMIT THE SELECTED IR CODE. STORE INPUT=TUNER AS CURRENT OPERATION CODE. |

FIG. 9

| OPERATION TABLE INPUT SCREEN |||
|---|---|---|
| EXPLANATION: || OPERATION MODE<br>☐ INPUT = TUNER<br>☐ INPUT = DVD<br><br>☐ SHIFTED − TO MODE |
| MANIPULATION OF REMOTE CONTROLLER A | MANIPULATION OF REMOTE CONTROLLER B ||
| REMOTE CONTROLLER A<br><br>MAKER<br>TYPE<br>MODEL | REMOTE CONTROLLER B<br><br>DEDICATED TO THIS SYSTEM ||
| CONTENTS OF INSTRUCTION MANUAL FOR REMOTE CONTROLLER A<br>TO TURN UP VOLUME, DEPRESS VOL+KEY<br>TO TURN DOWN VOLUME, DEPRESS VOL−KEY |||

PERIPHERAL DEVICE CONTROL APPARATUS

BACKGROUND OF THE INVENTION

The present invention relates to peripheral device control apparatus capable of remote-controlling desired peripheral devices.

Most of the CD, DVD and other audio devices known today can be remotely operated or controlled via remote controllers. Although useful, the remote controllers are sometimes found disadvantageous in that various remote controllers have to be used properly in accordance with types of device to be operated, e.g. a CD remote controller for a CD device and DVD remote controller for a DVD device. Among possible solutions to the inconvenience is the so-called "learning remote controller", which is disclosed, for example, in Japanese Patent Application Laid-open Publication No. HEI-7-7771. Namely, in this case, a user first performs remote control operation on a remote controller for a desired device (hereinafter "device A") in order to cause device A to perform a desired action or operation (hereinafter "operation B"), causes the learning remote controller to receive an infrared ray signal output at that time from the remote controller for device A, and then depresses a desired key (hereinafter "key C") on the learning remote controller to cause the learning remote controller to store the received infrared ray signal in association with depressed key C. After that, each time the user depresses key C of the learning remote controller, instead of operating the remote controller for device A, the learning remote controller transmits the infrared ray signal associated with depressed key C, so that device A can be caused to perform operation B.

However, with the learning remote controller, it is necessary to store all infrared ray signals for causing the device to perform various desired operations, and such infrared-ray-signal storing operation by the user tends to be bothersome and time-consuming. Besides, because the learning remote controller is, after all, a remote controller, it is necessary for the user to operate the learning remote controller before a desired device so that an infrared ray signal, output from the learning remote controller, can reach the desired device. Where there are a plurality of types of devices to be controlled via the same learning remote controller and when a particular one of the devices is to be caused to perform desired operation, the user has to direct the learning remote controller toward the particular device and then find and depress a specific key among many keys of the learning remote controller. Such manipulation, by the user, of the learning remote controller tends to be extremely cumbersome. Further, because the keys of the learning remote controller are limited in number, it is difficult to cause each of the plurality of types of devices to perform a plurality of kinds of operations via the learning remote controller.

SUMMARY OF THE INVENTION

In view of the foregoing, it is an object of the present invention to provide an improved peripheral device control apparatus which can readily control any one of a plurality of devices in response to a user giving an operation signal to a single input section.

In order to accomplish the above-mentioned object, the present invention provides an improved peripheral device control apparatus, which comprises: a storage section that stores a plurality of operation tables, each indicative of operational content for remote-controlling a desired peripheral device in response to an operation signal, in association with a plurality of operation modes and also stores a current operation mode; an input section that receives an operation signal; and a control section that performs remote control, corresponding to the operation signal received via the input section, on the peripheral device in accordance with the operation table corresponding to the current operation mode among the plurality of operation table stored in the storage section.

With such arrangements, the user can remote-control any one of a plurality of types of peripheral devices, by just giving an operation signal to the single input section of the peripheral device control apparatus.

In a preferred embodiment, the peripheral device control apparatus further comprises a signal generation section that generates a remote control signal, and a transmission section that transmits the remote control signal generated by the signal generation section. The storage section further stores peripheral device control information related to remote control signals receivable by various types of peripheral devices. When a remote control signal to be transmitted to a desired one of the peripheral devices is designated, is designated, in association with the operation signal received via the input section, in the operation table corresponding to the current operation mode among the plurality of operation table stored in the storage section, the control section performs control to cause the signal generation section to generate the remote control signal on the basis of the peripheral device control information stored in the storage section. With such arrangements, the user can remote-control any one of a plurality of types of peripheral devices without minding a difference among remote control signals to be applied to the different peripheral devices.

In a preferred embodiment, the transmission section transmits the remote control signal to an infrared ray generation section that is connected to the transmission section, e.g. via a cable. The user may place the infrared ray generation section in any desired position. Thus, even where the desired peripheral device is installed in a position which an infrared ray signal generated from a remote controller can not reach, the peripheral device can be remote-controlled appropriately as long as the infrared ray generation section is placed before the peripheral device.

In a preferred embodiment, the peripheral device control apparatus further comprises a communication section. The control section downloads peripheral device control information from a server via the communication section and stores the downloaded peripheral device control information into the storage section. With such arrangements, any desired peripheral device can be readily added to a group of objects of control by the peripheral device control apparatus of the present invention.

In a preferred embodiment, the input section includes a wireless signal reception section that receives an operation signal from a remote controller. Thus, the user can remote-control any one of a plurality of types of peripheral devices by manipulating only one remote controller. When the operation signal received via the wireless signal reception section is an operation signal transmitted from a remote controller other than a particular remote controller, the control section may cause the signal generation section to generate a remote control signal identical to the received operation signal. Thus, when the user has given an operation signal to the peripheral device control apparatus by manipulating a remote controller for a particular peripheral device, the operation signal is given directly (i.e., as is) to the peripheral device as the remote control signal.

In a preferred embodiment, when an alteration in the operation mode is instructed, as a change in the operational content responsive to the operation signal received via the input section, in the operation table corresponding to the current operation mode among the plurality of operation table stored in the storage section, the control section changes the operation mode to be stored in said storage section, in accordance with the instructed change in the operation mode. Thus, many types of remote control signals corresponding to many different operation modes can be generated with only a few types of operation signals.

In a preferred embodiment, the control section edits the operation tables in accordance with operation signals received via the input section. Thus, remote control can be performed on a plurality of peripheral devices in accordance with various connecting states between the peripheral devices.

The following will describe embodiments of the present invention, but it should be appreciated that the present invention is not limited to the described embodiments and various modifications of the invention are possible without departing from the basic principles of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 5 is a block diagram showing various functions performed by the peripheral device control apparatus;

FIG. 6 is a diagram showing example stored contents of an IR database employed in the embodiment;

FIG. 7 is a diagram showing an example of a group of operation tables employed in the embodiment;

FIG. 9 is a diagram explanatory of various functions performed in a second embodiment of the peripheral device control apparatus;

DETAILED DESCRIPTION OF THE INVENTION

First Embodiment

Figure 1:
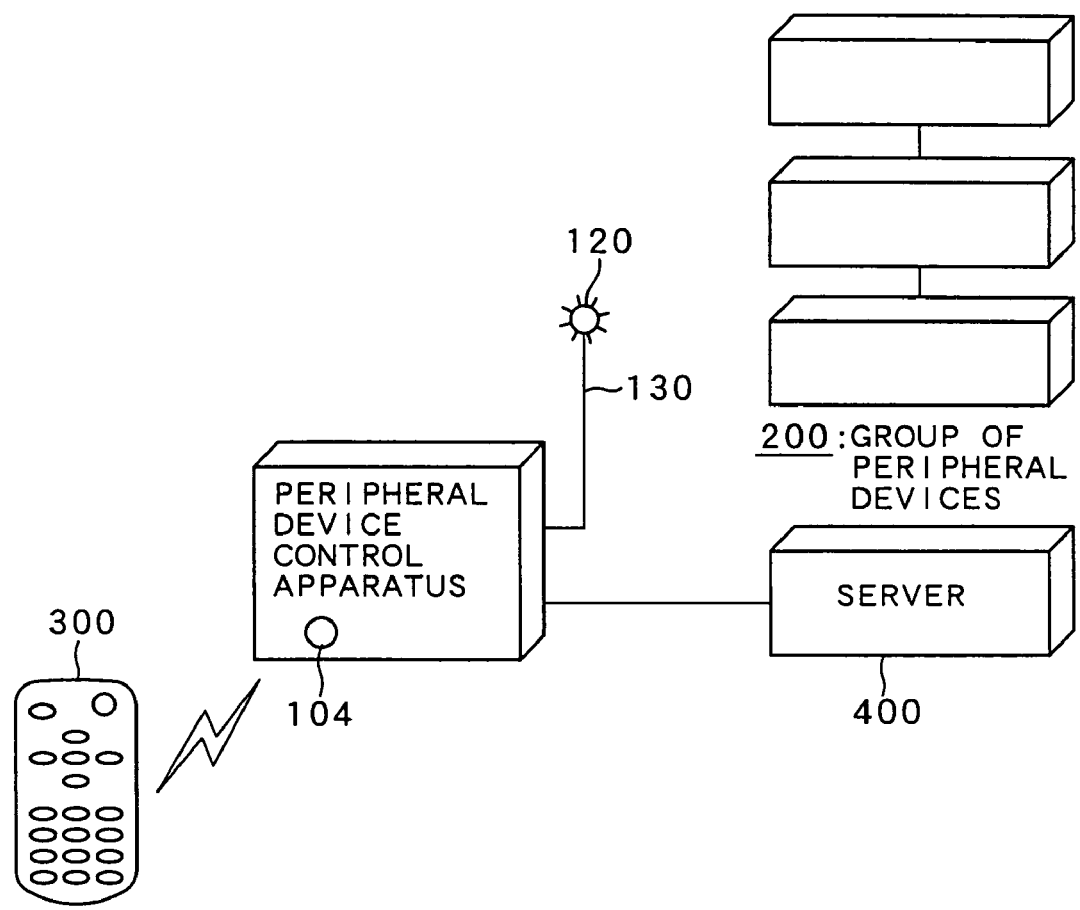
FIG. 1 is a block diagram showing an example general setup of an audio system employing a peripheral device control apparatus in accordance with a first embodiment of the present invention.
Figure 2:
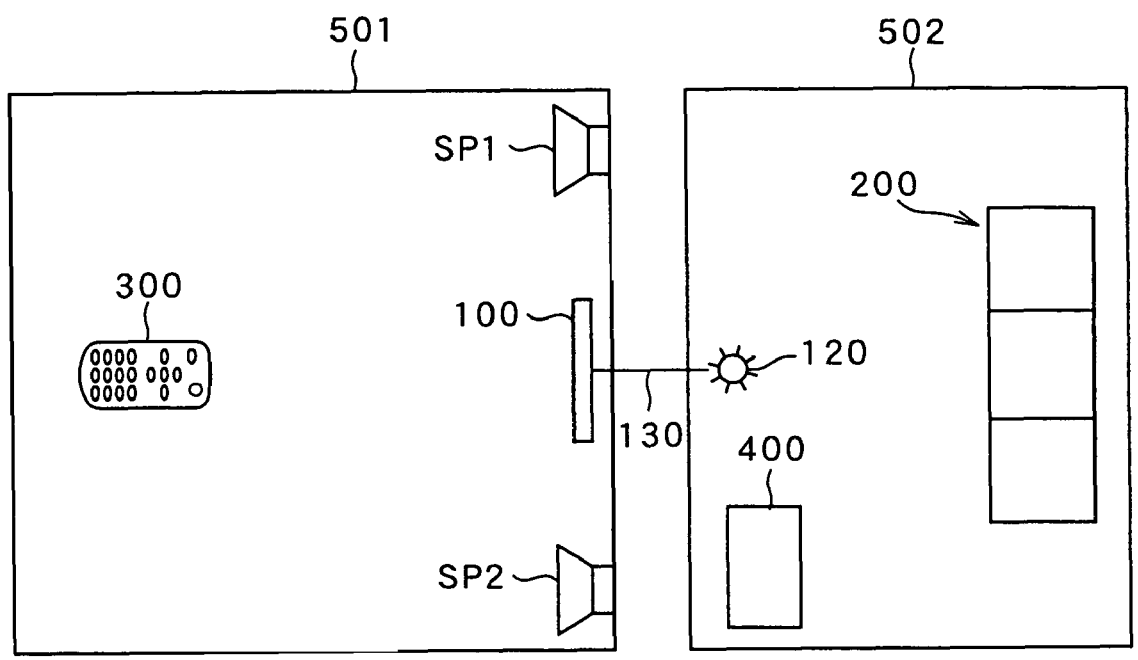
FIG. 2 is a plan view showing an example layout of various devices and apparatus constituting the audio system shown in FIG. 1.
Figure 3:
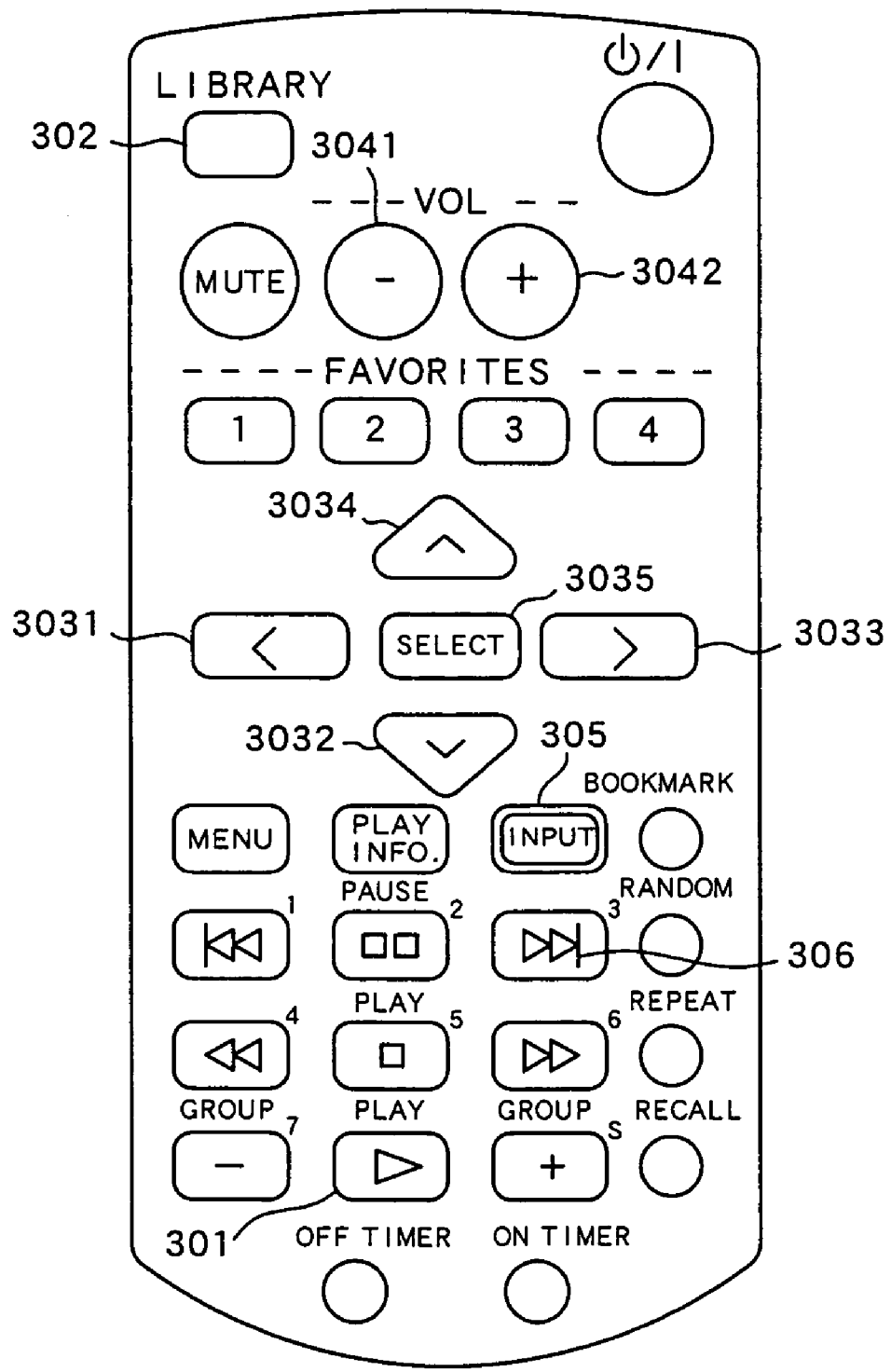
FIG. 3 is a plan view showing an outer appearance of a remote controller employed in the embodiment of FIG. 1.

FIG. 1 is a block diagram showing an example general setup of an audio system employing a peripheral device control apparatus 100 in accordance with a first embodiment of the present invention, and FIG. 2 is a diagram showing an example layout of various devices and apparatus constituting the audio system shown in FIG. 1. In FIG. 1, the peripheral device control apparatus 100 performs remote control on a group of peripheral devices 200, such as a tuner, DVD device, CD device and amplifier. The peripheral devices 200, which are for example devices purchased by a user of the peripheral device control apparatus 100, can be remotely controlled individually via respective dedicated remote controllers. Remote controller 300 is a dedicated remote controller for the peripheral device control apparatus 100. Further, FIG. 3 is a plan view showing an outer appearance of the remote controller 300. When any desired one of the peripheral devices 2 is to be remote-controlled, the user only has to operate a predetermined key on the remote controller 300 for instructing the remote control of the desired peripheral device. In response to the user's operation of the predetermined key, the remote controller 300 generates a digital signal, modulates a carrier wave, having a frequency for the peripheral device control apparatus 100, with the generated digital signal, and outputs the modulated carrier wave after converting the carrier wave into an IR (Infrared) code. Upon receipt of the IR code from the remote controller 300, the peripheral device control apparatus 100 generates a code for causing the desired peripheral device (i.e., to-be-remote-controlled peripheral device) to perform the operation instructed by the received IR code, and then outputs the generated code, as a to-be-transmitted IR code, via an infrared ray generation section 120. Sever 400 has an IR database stored therein. The IR database is a collection of pieces of peripheral device control information corresponding to various devices, such as tuners, DVD devices, CD devices and amplifiers, supplied by various companies, e.g. makers of the devices. When the peripheral device control apparatus 100 generates the to-be-transmitted IR code on the basis of the received IR code, the peripheral device control information functions as bases for signal generation rules. Details of the peripheral device control information will be set forth later.

Preferably, the peripheral device control apparatus 100 and the group of peripheral devices 200 are positioned in separate rooms partitioned from each other with walls, as illustratively shown in FIG. 2. In the illustrated example of FIG. 2, the peripheral device control apparatus 100, which is a wall-mounted apparatus, is positioned in the room 501 and mounted on the wall partitioning between the rooms 501 and 502. Speakers SP1 and SP2 are positioned in the room 501 and the user uses the remote controller 300 within the room 501. The group of peripheral devices 200 is positioned in the room 502, and the group includes an amplifier. Output signals of left (L) and right (R) channels from the amplifier are supplied to the speakers SP1 and SP2 via cables (not shown). The infrared ray generation section 120 is positioned at a location within the room 502 such that it can transmit IR codes to all of the peripheral devices 200; for example, the infrared ray generation section 120 is positioned before and at some distance from the group of peripheral devices 200. The infrared ray generation section 120 is coupled via a cable 130 with the peripheral device control apparatus 100 on the other side of the wall. In the illustrated example of FIG. 2, the server 400, which is positioned within the room 502, is coupled with the peripheral device control apparatus 100 via a not-shown cable.

Figure 4:
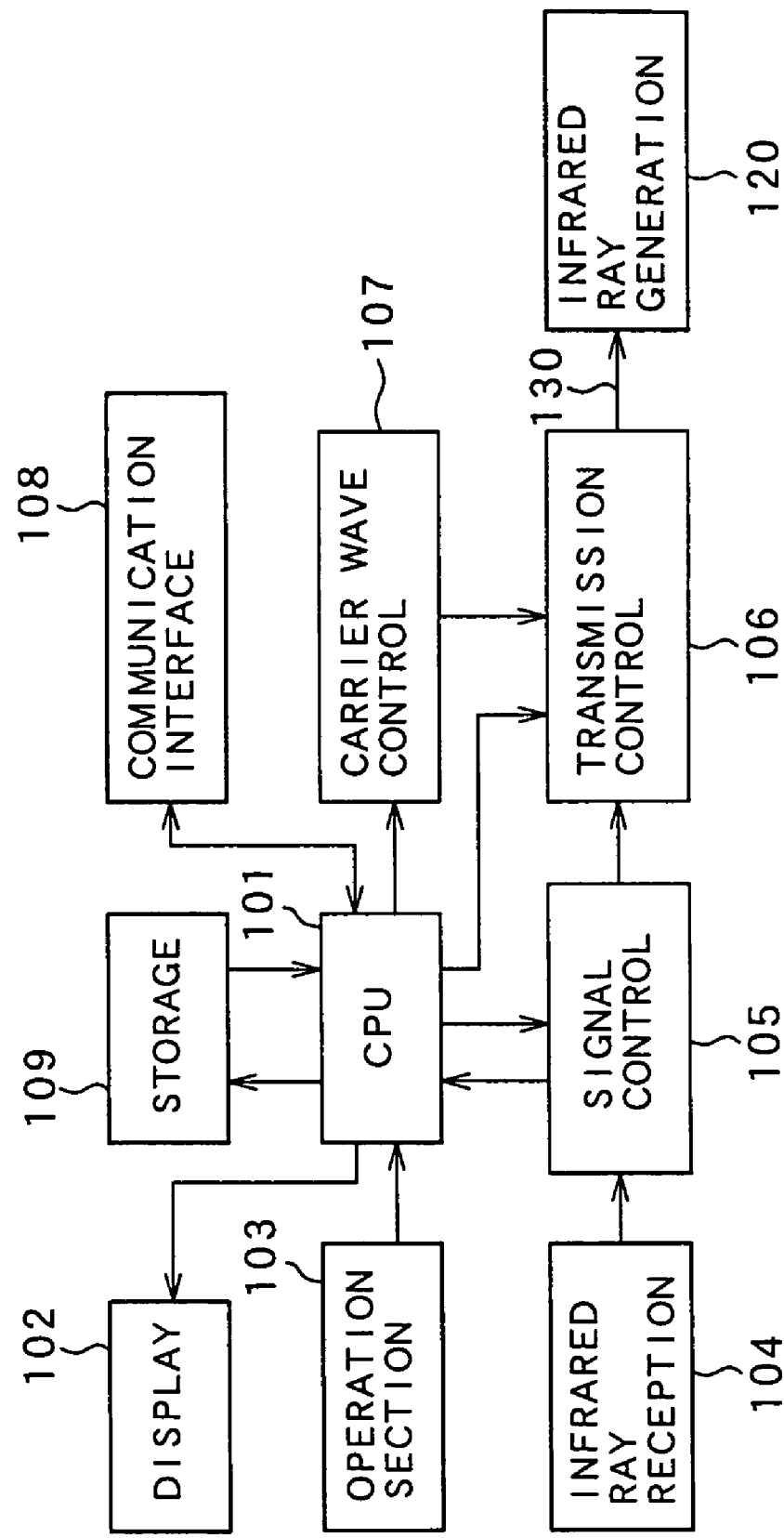
FIG. 4 is a block diagram showing an example general setup of the peripheral device control apparatus of FIG. 1.

FIG. 4 is a block diagram showing an example general setup of the peripheral device control apparatus 100. In the peripheral device control apparatus 100, a CPU 101 is a processor that controls various components of the control apparatus 100. Display section 102, operation section 103 and infrared ray reception section 104 are provided on a front surface of the main body of the peripheral device control apparatus 100. The display section 102 is, for example, a liquid crystal display (LCD) panel, and the operation section 103 and infrared ray reception section 104 function as an input means for receiving an operation signal from the user. The operation section 103 includes various operators, such as push buttons and volume control knobs, and circuitry for detecting user's operation of the operators and outputting operation information, indicative of the user's operation, to the CPU 101. The infrared ray reception section 104 includes an element for converting each IR code, received from the remote controller, into an electrical signal. Signal control section 105 comprises a switch for controlling a transmitted direction of each electrical signal; more specifically, the signal control section 105 delivers an electrical signal, output from the infrared ray reception section 104, to the CPU 101, and delivers an electrical signal, output from the CPU 101, to a transmission control section 106. The transmission control section 106 and carrier wave control section 107 together constitute a signal generation means for generating a remote control signal. The carrier wave control section 107 includes an oscillator of a variable oscillation frequency. Carrier wave of a particular frequency designated by the CPU 101 is supplied from the carrier wave control section 107 to the transmission control section 106. Note that the carrier wave control section 107 does not supply any carrier wave when no particular carrier wave frequency is designated by the CPU 101. When a carrier wave frequency has been designated by the CPU 101, the transmission control section 106 modulates the carrier wave, supplied from the carrier wave control section 107, with a code (digital signal) given from the CPU 101 via the signal control section 105 and outputs the thus-modulated carrier wave to the infrared ray generation section 120 as a remote control signal. The infrared ray generation section 120 converts the remote control signal (electrical signal), supplied from the transmission control section 106, into an IR code in the form of an infrared ray signal, so as to transmit the converted IR code.

In a preferred embodiment, the peripheral device control apparatus 100 has an "IR flasher" function. The "IR flasher" function is a function that causes an IR code, received via the infrared ray reception section 104, to be output directly (i.e., as is) via the infrared ray generation section 120. In order to perform such an IR flasher function, the CPU 101 receives all of the output signals from the infrared ray reception section 104, examines, for each of the received signals, the carrier wave frequency and format of the code superimposed on the received signal. If the examination results have indicated that the received signal is not a signal transmitted from the remote controller 300, then the CPU 101 controls the carrier wave control section 107 and transmission control section 106 so that a signal identical to the received signal is supplied to the infrared ray generation section 120.

The IR flasher function may be achieved in any other manner than the above-described, e.g. by use of two filters. In the case where two filters are employed and if the carrier wave frequencies f used in the respective remote controllers of the peripheral devices 200 are each in a range lower than a predetermined maxim frequency (fmax) but higher than a predetermined minimum frequency (fmin) (i.e., fmin<f<fmax), a frequency outside the range is used as a carrier wave frequency f300 for the remote controller 300. If, for example, the carrier wave frequency f300 for the remote controller 300 is higher than the maxim frequency fmax and has a cutoff frequency fc meeting a condition of "f300>fc>fmax", the signal control section 105 includes a low-pass filter that selects, from among output signals from the infrared ray reception section 104, only each electrical signal lower in frequency than the cutoff frequency fc and outputs the thus-selected electrical signal to the transmission control section 106, and a high-pass filter that selects, from among the output signals from the infrared ray reception section 104, only each electrical signal higher in frequency than the cutoff frequency fc and outputs the thus-selected electrical signal to the CPU 101. With such arrangements, only each signal received from the remote controller 300 is delivered to the CPU 101, while each signal received from another remote controller than the remote controller 300 is delivered to the transmission control section 106 without being delivered to the CPU 101. In this case, the CPU 101 gives no instruction to the carrier wave control section 107 and transmission control section 106. Thus, the carrier wave control section 107 does not output any carrier wave, and the output signal from the infrared ray reception section 104 passes through the transmission control section 106 to the infrared ray generation section 120 and is then output as an IR code via the infrared ray generation section 120. The foregoing has been a brief description about an alternative scheme for achieving the IR flasher function.

Communication interface 108 controls communication between the CPU 101 and another device, such as the server 400 of FIG. 1. Storage section 109 in the instant embodiment comprises a RAM and ROM. The RAM is used as a working area for the CPU 101, and the ROM has prestored therein various programs to be executed by the CPU 101 and various data to be used by the programs.

Now, with reference to FIG. 5, a description will be given about primary functions performed by the CPU 101 in accordance with the programs stored in the ROM. In FIG. 5, an information management section 1011, mode shift/signal generation control section 1012 and signal generation section 1013, IR flasher section 1014 are subroutines or steps that constitute a program to be executed by the CPU 101. IR database 1021, current operation mode 1022 and group of operation tables 1023 are data stored in the RAM of the storage section 109. Note that one or two or all of the information management section 1011, mode shift/signal generation control section 1012 and signal generation section 1013 may of course be implemented by hardware.

When the user has manipulated or operated the operation section 103 or remote controller 300 to request desired peripheral device control information and operation information indicative of such user's operation has been received via the operation section 103 or infrared ray reception section 104, the information management section 1011 downloads the requested peripheral device control information from the server 400 and registers the thus-downloaded peripheral device control information in the IR database 1021.

FIG. 6 shows an example of peripheral device control information registered in the IR database 1021, which particularly shows amplifier (amp.) information, DVD information and IR code format parameters having been registered in the IR database 1021 as a result of the user requesting peripheral device control information for an amplifier and DVD device.

In the amp. information, "Company Name" indicates a name of a maker of the amplifier, "Model Name" indicates a model name of the amplifier. "Number of Inputs=6" indicates that the amplifier has six input terminals. "Number of Inputs=6" is followed by a header "Input Name", which is in turn followed by definition information related to devices (CD device, DVD device, etc. in the illustrated example) connectable to the six input terminals of the amplifier. Further, the definition information is followed by a header "remote controller IR code", which is in turn followed by definition information related to a remote controller (R.C.) IR code of the remote controller for the amplifier. Here, the "remote controller IR code" is a digital signal to be used for modulating the carrier wave when any one of the keys of the remote controller for the amplifier has been depressed. The definition information related to a remote controller (R.C.) IR code includes format information. The format information is a collection of information defining a frequency of the carrier waveform to be modulated with the remote controller IR code and a format of a header in the remote controller IR code, information designating a specific parameter from among the IR code format parameters, etc. The format information is followed by operation information indicative of operation of various keys of the remote controller for the amplifier, such as "Power ON" and "Power OFF" keys, and codes associated with these operation information, i.e. remote controller IR codes each comprising a "0"/"1" bit string to be used for digital modulation of the carrier wave. DVD information is organized similarly to the above-described amp. information. The IR code format parameters in the DVD information are parameters for specifying a waveform of an infrared ray signal that is transmitted from the remote controller for the amp. or remote controller for the DVD device, such as time lengths of individual "0"/"1" bits to be used for digital modulation of the carrier wave. These parameters are quoted by the format information of the amp. information or DVD information. The foregoing has been a description about the IR database 1021.

The information management section 1011 shown in FIG. 5 is capable of newly adding, to the IR database 1021, peripheral device control information stored in the server 400 and deleting peripheral device control information of a designated peripheral device from the IR database 1021. Further, the information management section 1011 edits the group of operation tables 1023 in the RAM of the storage section 109, in response to user's operation of the operation section 103 or remote controller 300.

FIG. 7 is a diagram showing an example of the group of operation tables 1023. The group of operation tables 1023 is a collection of operation tables defined in corresponding relation to various operation modes of the peripheral device control apparatus 100. The operation mode of the peripheral device control apparatus 100 varies in accordance with variation in state of the group of peripheral devices 200. For example, when the peripheral device control apparatus 100 has transmitted, via the infrared ray generation section 120, an IR code instructing that a source of input to the amplifier be switched to the tuner, the amplifier in the group of peripheral devices 200 is expected to switch the input source to the tuner upon receipt of the IR code, so that the peripheral device control apparatus 100 is placed in an "Input=Tuner" operation mode. Further, when the peripheral device control apparatus 100 has transmitted, via the infrared ray generation section 120, an IR code instructing that the source of input to the amplifier be switched to the DVD device, the amplifier in the group of peripheral devices 200 is expected to switch the input source to the DVD device upon receipt of the IR code, so that the peripheral device control apparatus 100 is placed in an "Input=DVD" operation mode. The operation table is defined for each of such operation modes.

In each of the operation tables corresponding to the various operation modes, pieces of information indicative of operation of various keys on the remote controller 300 are stored in association with pieces of information indicative of content of operations to be performed in response to the operation of the keys. The provision of the separate operation tables for the various operation modes allows different operations to be instructed in the various operation modes through depression of a same key; namely, the same key can be used to instruct a different operation in each of the operation modes. For example, if a PLAY key 301 (see FIG. 3) has been depressed on the remote controller 300 while the peripheral device control apparatus 100 is in the "Input=DVD" operation mode, an IR code for the DVD device, among IR codes of the individual peripheral devices corresponding to the "PLAY" key operation, has to be transmitted via the infrared ray generation section 120. But, if the PLAY key 301 (see FIG. 3) has been depressed on the remote controller 300 while the peripheral device control apparatus 100 is in an "Input=CD" operation mode, an IR code for the CD device, rather than the IR code for the DVD device, has to be transmitted via the infrared ray generation section 120. Because there is a need to change the content of the operation ("operational content") depending on the selected operation mode as noted just above, the different operation tables are provided, in the instant embodiment, in corresponding relation to the various operation modes. In the illustrated example of FIG. 7, user's operation of any one of the keys on the remote controller 300 can transmit an IR code that corresponds to operation of one of the keys on the remote controller for a specific peripheral device. Note however that the information indicative of operation of the various keys on the remote controller 300 and the information indicative of content of operations to be performed by the peripheral device need not necessarily correspond to each other in a one-to-one relation. For example, the operation table may be arranged in such a manner that a plurality of IR codes corresponding to operation of a plurality of the keys on the remote controller for a particular peripheral device can be sequentially transmitted in response to user's operation of any one of the keys on the remote controller 300. Conversely, the operation table may be arranged in such a manner that an IR code corresponding to operation of any one of the keys on the remote controller for a particular peripheral device can be transmitted in response to user's operation of a plurality of the keys on the remote controller 300. The fore going is an overview of the group of operation tables.

In FIG. 5, when an infrared ray signal from the remote controller 300 has been received via the infrared ray reception section 104 and a corresponding reception signal has been output from the infrared ray reception section 104, the mode shift/signal generation control section 1012 identifies the key operation performed on the remote controller 300 on the basis of the reception signal and performs an operation corresponding to the identified key operation. At that time, the mode shift/signal generation control section 1012 selects, from among the group of operation tables, a particular operation table corresponding to a current operation mode stored in the RAM, identifies, from the selected operation mode, an operation corresponding to the user's key operation on the remote controller 300 and then performs the identified operation. If the operation corresponding to the user's key operation is shifting from the current operation mode to another operation mode, then the mode shift/signal generation control section 1012 writes the "other operation mode" into the RAM as a new current operation mode. Further, if the operation corresponding to the user's key operation is causing any one of the peripheral devices to perform a given operation, the mode shift/signal generation control section 1012 reads out, from the IR database 1021, information necessary for generating an IR code to cause that peripheral device to perform the given operation, such as information indicative of the carrier wave frequency for the peripheral device, remote controller IR code instructing the given operation, format information and IR code format parameters to be quoted by the format information, and then the mode shift/signal generation control section 1012 supplies the read-out information to the signal generation section 1013.

In accordance with the information supplied from the mode shift/signal generation control section 1012, the signal generation section 1013 performs control of the carrier wave frequency by means of the carrier wave control section 107 and control of a to-be-transmitted signal waveform by means of the transmission control section 106. The function performed by the IR flasher section 1014 has already been set forth above.

Figure 8:
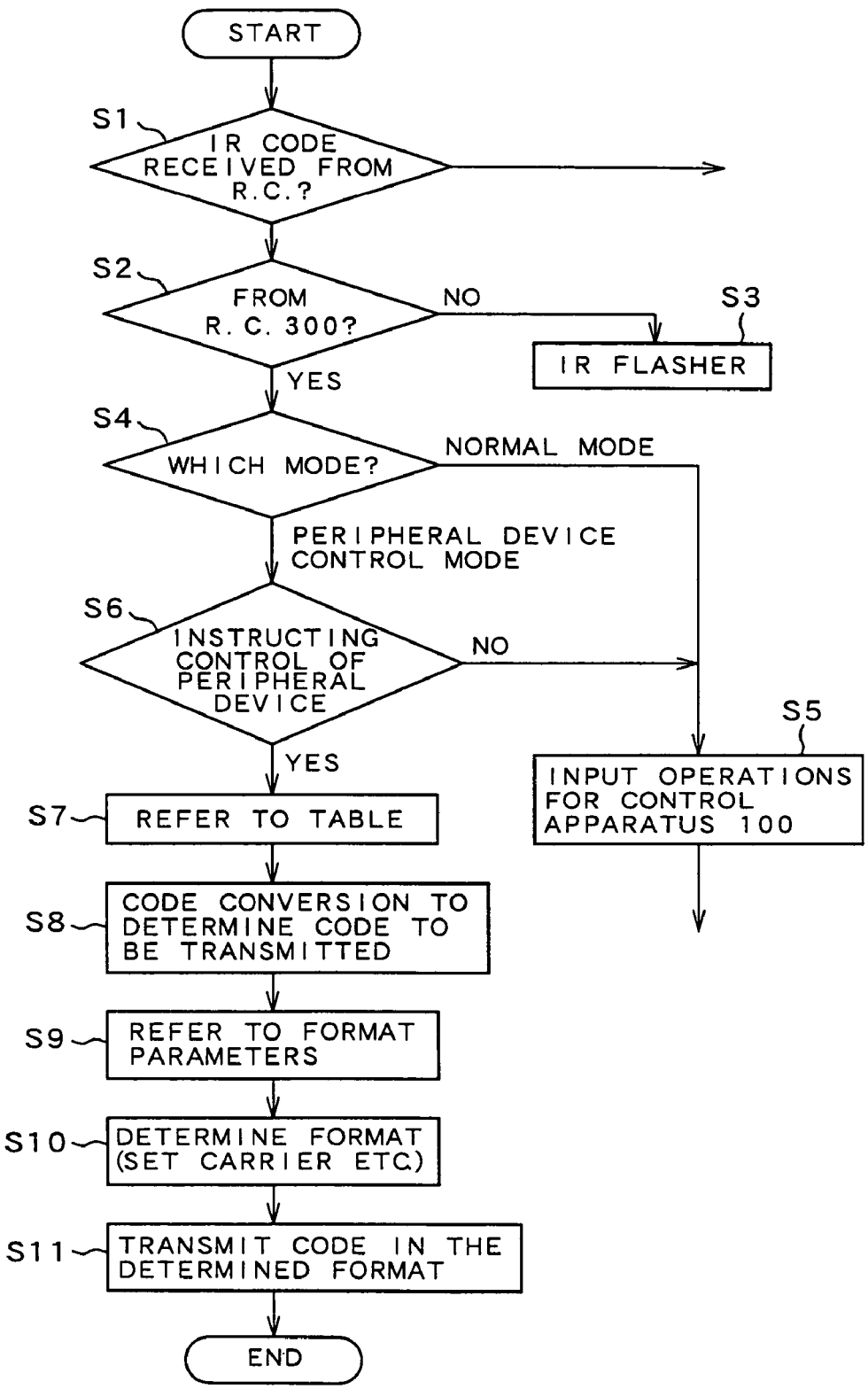
FIG. 8 is a flow chart showing an example sequence of operations performed in the embodiment.

FIG. 8 is a flow chart of a program executed by the CPU 101, and the following paragraphs describe behavior of the instant embodiment with reference to the flow chart. The CPU 101 repetitively executes this program at predetermined time intervals that are relatively short but long enough to avoid error or failure in reception of IR codes from any remote controller.

First, at step S1, the CPU 101 determines whether any IR code has been received from a remote controller (R.C.). If no IR code has been received, the CPU 101 terminates the execution of the program. If any IR code has been received, on the other hand, the CPU 101 analyses the carrier wave frequency of the reception signal output from the infrared ray reception section 104 and format of the digital signal superimposed on the carrier wave, and then, determines, on the basis of results of the analysis, whether the IR code received via the infrared ray reception section 104 is one transmitted from the remote controller 300 (step S2). With a NO determination at step S2, the CPU 101 controls the carrier control section 107 and transmission control section 106 so that the infrared ray generation section 120 is supplied with a signal having a same carrier wave frequency as the reception signal output from the infrared ray reception section 104 and having a same digital signal waveform as the digital signal superimposed on the reception signal (step S3). These are the operations as the above-described IR flasher 1014. In this manner, the IR code from the remote controller, received via the infrared ray generation section 120, is transmitted directly (i.e., as is) toward the group of peripheral devices 200 via the infrared ray generation section 120.

If, on the other hand, a YES determination has been made at step S2, i.e. if the IR code received via the infrared ray reception section 104 is one transmitted from the emote controller 300, then the CPU 101 determines whether the current operation mode of the peripheral device control apparatus 100 is a normal operation mode or a peripheral device control mode (step S4). If the current operation mode is the normal operation mode, the CPU 101 deems the received IR code as directed to the peripheral device control apparatus 100, and then carries out operations corresponding to the received IR code (step S5).

The operations carried out at step S5 include, for example, the following operations that are carried out by the information management section 1011 of FIG. 5. Namely, once the user depresses a LIBRARY key 302 on the remote controller 300 of FIG. 3 and a corresponding IR code is received via the infrared ray reception section 104, the information management section 1011 downloads a listing of the names of the peripheral devices of which pieces of peripheral device control information are stored in the server 400, and displays the downloaded listing on the display section 102. Once the user manipulates any of the cursor keys 3031-3034 and a corresponding IR code is received via the infrared ray reception section 104, the information management section 1011 moves, in accordance with the received IR code, a cursor-indicated position on the peripheral device name listing displayed on the display section 102. Then, once the user confirms that the cursor currently points to or indicates a desired one of the peripheral device names and depresses a SELECT key 3035 and a corresponding IR code is received via the infrared ray reception section 104, the information management section 1011 downloads, from the server 400, the peripheral device control information corresponding to the peripheral device name currently indicated by the cursor, and stores the downloaded peripheral device control information into the IR database 1021. By the user repeating such operations, the peripheral device control information pertaining to the group of peripheral devices 200, such as the amplifier, DVD device, CD device and tuner, can be stored into the IR database 1021. When all necessary pieces of the peripheral device control information have been stored in the IR database 1021 in the foregoing manner, the peripheral device control apparatus 100 is shifted from the normal operation mode to the peripheral device control mode. Note that the above-described operations by the information management section 1011 can be initiated by user's key operation on the operation section 103 as well as by user's operation on the remote controller 300. The foregoing are example operations performed at step S5.

When an IR code has been received from the remote controller 300 while the peripheral device control apparatus 100 is in the peripheral device control mode, the CPU 101 makes an input determination as to whether or not the received IR code is one instructing control of a particular peripheral device (step S6). The reason why such an input determination is made is that the remote controller 300 is provided with keys intended for control of the peripheral device control apparatus 100 as well as for control of any one of the peripheral devices. If an IR code corresponding to any one of such keys for control of the peripheral device control apparatus 100 has been received, it is determined that the received IR code is not an IR code intended for control of any one of the peripheral devices, and the operations of step S5 are carried out in the above-described manner. If, on the other hand, the received IR code is an IR code intended for control of any one of the peripheral devices, the CPU 101 moves from step S6 to step S7.

At step S7, the CPU 101 starts an operation as the mode shift/signal generation control section 1012 shown in FIG. 5. More specifically, the mode shift/signal generation control section 1012 refers to one operation table corresponding to the current operation mode among the group of operation tables 1023 stored in the RAM, and it also refers to information indicative of the content of the operation corresponding to the key operation on the remote controller 300 represented by the received IR code.

At following step S8, the CPU 101 carries out conversion of the IR code to determine a code to be transmitted. More specifically, if the IR code received at step S1 is an IR code generated in response to user's operation of a volume key 3041 or 3042, the mode shift/signal generation control section 1012, at step S8, reads out, from the peripheral device control information for the amplifier stored in the IR database 1021, a remote controller IR code instructing a volume control operation, in accordance with the content of the operation referred to at step S7. Then, the mode shift/signal generation control section 1012 delivers the read-out remote controller IR code to the signal generation section 1013. Because, in the operation tables corresponding to all peripheral device operation modes, such as "Input=Tuner", "Input=DVD" and "Input=CD", as illustrated in FIG. 7, "select, from the peripheral device control information for the amplifier, a remote controller IR code instructing a volume control operation and then transmit the selected remote controller IR code" is defined as the content of the operation to be performed when an IR code, generated in response to depression of a volume key, has been received from the remote controller 300. Among other rules to be applied universally to all of the peripheral device operation modes is a rule related to an operation that is to be performed when an IR code generated in response to user's operation of an INPUT key has been received.

At next step S9, the mode shift/signal generation control section 1012 reads out format parameters necessary for transmitting the to-be-transmitted code obtained at step S8 above. For example, when the remote controller IR code instructing volume control operation of the amplifier is to be transmitted, the mode shift/signal generation control section 1012 reads out, from among the peripheral device control information for the amplifier stored in the IR database 1021, carrier wave frequency information, format information and IR code format parameters quoted by the format information. Then, the mode shift/signal generation control section 1012 delivers the thus read-out format parameters to the signal generation section 1013.

At following step S10, the signal generation section 1013 transfers the remote controller IR code, delivered thereto at step S8, to the transmission control section 106, transfers the carrier wave frequency information, delivered thereto at step S9, to the carrier wave control section 107, and also transfers the format information and IR code format parameters, delivered thereto at step S9, to the transmission control section 106. Then, the carrier wave control section 107 starts supplying the transmission control section 106 with a carrier wave of the frequency designated by the carrier wave frequency information transferred from the signal generation section 1013.

At step S11, the signal generation section 1013 gives a code transmission instruction to the transmission control section 106. The transmission control section 106 creates a waveform of a digital signal to be transmitted, on the basis of the remote controller IR code, format information and IR code format parameters transferred at step S10 above. Further, the transmission control section 106 modulates the carrier wave, output from the carrier wave control section 107, with the generated digital signal and then supplies the thus-modulated carrier wave to the infrared ray generation section 120. The infrared ray generation section 120 converts the modulated carrier wave into an IR code in the form of an infrared ray signal and transmits the IR code to the group of peripheral devices 200. If the IR code received at step S1 is one generated in response to user's operation of the volume key 3041 or 3042, then an IR code instructing a volume control operation of the amplifier is transmitted from the infrared ray generation section 120 at step S11. As a consequence, the amplifier in the group of peripheral devices 200 receives the IR code from the infrared ray generation section 120 and performs the volume control operation. Namely, when the volume key 3041 or 3042 has been operated while the peripheral device control apparatus 100 is in the peripheral device control mode, the volume control operation of the amplifier, one of the peripheral devices 200, rather than the volume control operation of the peripheral device control apparatus 100, is performed.

Let it be assumed that, after step S11, the user depresses the INPUT key 305 of the remote controller 300 and an IR code indicative of the depression of the INPUT key 305 is received by the infrared ray reception section 104. In this case, the CPU 101 goes to step S7 by way of steps S1, S2, S4 and S6. At step S7, the CPU 101 performs the operation as the mode shift/signal generation control section 1012 shown in FIG. 5, in the same manner as described above. If the current operation mode of the peripheral device control apparatus 100 is "Input=Tuner" mode, the mode shift/signal generation control section 1012 refers to the content of the operation corresponding to the INPUT key operation in the operation table corresponding to the "Input=Tuner" mode. Then, the mode shift/signal generation control section 1012 reads out, from among the peripheral device control information for the amplifier stored in the IR database 1021, a remote controller IR code for switching the source of input to the amplifier to the DVD device (step S8). Also, at that time, the mode shift/signal generation control section 1012 writes, into the RAM, "Input=DVD" as information indicative of the current operation mode. Then, the CPU 101 carries out the operations at and after step S9 in the same manner as described above in relation to the volume control operation and transmits, via the infrared ray generation section 120, an IR code for switching the input of the amplifier to the DVD device.

Similarly, when the IR code indicative of the depression of the INPUT key 305 has been received by the infrared ray reception section 104 while the peripheral device control apparatus 100 is in the "Input=DVD" mode, an IR code for switching the input of the amplifier to the CD device is transmitted from the infrared ray generation section 120, and "Input=CD" is written into the RAM as the information indicative of the current operation mode. When the IR code indicative of the depression of the INPUT key 305 has been received by the infrared ray reception section 104 while the peripheral device control apparatus 100 is in the "Input=CD" mode, an IR code for switching the input of the amplifier to the tuner is transmitted from the infrared ray generation section 120, and "Input=Tuner" is written into the RAM as the information indicative of the current operation mode (see FIG. 7). Thus, by the user repeating the depression of the INPUT key 305, the input of the amplifier can be switched circularly among the tuner, DVD device and CD device (i.e., tuner→DVD→CD→tuner).

Let it be assumed that, after the foregoing operation, the user depresses a SKIP key 306 on the remote controller 300 while the peripheral device control apparatus 100 is in the "Input=Tuner" mode and an IR code indicative of the depression of the SKIP key 306 is received by the infrared ray reception section 104. Because the current operation mode is the "Input=Tuner" mode, a remote controller IR code instructing a channel change of the tuner is read out as the remote controller IR code corresponding to the SKIP key operation at steps S7 and S8 and transmitted at steps S9-S11.

Assume that the user depresses the PLAY key 301 of the remote controller 300 and an IR code indicative of the depression of the PLAY key 301 is received by the infrared ray reception section 104. If the depression of the PLAY key 301 has occurred while the operation mode is the "Input=DVD" mode, a remote controller IR code representative of the PLAY key operation and corresponding to playing of the DVD device is read out, and the read-out remote controller IR code is transmitted (steps S7-S11). As a consequence, reproduction of a DVD is initiated. If the depression of the PLAY key 301 has occurred while the operation mode is the "Input=CD" mode, a remote controller IR code representative of the PLAY key operation and corresponding to playing of the CD device is read out, and the read-out remote controller IR code is transmitted (steps S7-S11). As a consequence, reproduction of a CD is initiated.

Whereas the foregoing paragraphs have described example operations in accordance with which one IR code is transmitted to the group of peripheral devices 200 when the user has depressed any one of the keys on the remote controller 300, the instant embodiment can also transmit two or more IR codes to the group of peripheral devices 200 in response to user's operation of any one of the keys on the remote controller 300.

Further, in the instant embodiment, generation of two or more to-be-transmitted IR codes from one received IR code may be defined in the operation tables. In addition, operation mode shifts may be defined in the operation tables. Using such approaches, the usability of the remote controller 300 can be enhanced significantly.

The remote controller 300 shown in FIG. 3 includes four FAVORITE keys 3081-3084. Thus, the user can define in advance, in the operation tables corresponding to all of the operation modes, a signal generation rule for generating and transmitting an IR code for switching the input of the amplifier to the DVD device, a signal generation rule for generating and transmitting an IR code corresponding to playing of the DVD device and a mode shift rule for shifting the operation mode to the "Input=DVD" mode, for example, in association with the FAVORITE key 3081.

Thus, by just depressing the FAVORITE key 3081 of the remote controller 300, the user can perform a plurality of remote control operations, such as one for switching the input of the amplifier to the DVD device and one for starting playing of the DVD device.

As apparent from the forgoing, the instant embodiment allows the user to perform remote control of a plurality of peripheral devices by only manipulating the peripheral device control apparatus 100. At that time, the user can remote-control any desired peripheral device without minding the difference among the respective IR codes of the peripheral devices. Further, even though the group of peripheral devices 200 are placed in a different location from the peripheral device control apparatus 100 and unable to receive an IR code directly from the peripheral device control apparatus 100, the instant embodiment allows the user to readily control any desired one of the peripheral devices by only manipulating the peripheral device control apparatus 100, because it suffices to place only the infrared ray generation section 120 within a range where the group of peripheral devices 200 can receive an IR code from the infrared ray generation section 120.

Second Embodiment

Second embodiment of the peripheral device control apparatus 100 is arranged to facilitate the creation of the operation tables in the first embodiment. The second embodiment of the peripheral device control apparatus is constructed in generally the same manner as illustrated in FIG. 4; however, it is not of the wall-mounted type as illustrated in FIG. 2, but constructed more or less like a personal computer provided with an infrared ray generation section. It is preferable that the operation section 103 (see FIG. 4) in the second embodiment include a keyboard and a pointing device, such as a mouse. Further, it will be more advantageous if text data of instruction manuals of the remote controllers for the peripheral devices are included in the peripheral device control information.

Once the user manipulates the operation section 103 to request creation of an operation table and designate a desired peripheral device, the CPU 101 in the second embodiment causes the display section 102 to display an operation table input screen as illustrated in FIG. 9. On a section "Remote Controller A" of the operation table input screen is displayed an outer appearance of the remote controller (hereinafter referred to as "remote controller A") for manipulating the user-designated peripheral device. In a preferred implementation, the peripheral device control information includes image data indicative of the outer appearance of remote controller A and information indicative of respective names and locations of various keys provided on remote controller A. Further, on a section "Remote Controller B" of the operation table input screen is displayed an outer appearance of the remote controller 300 (hereinafter referred to as "remote controller B") for the peripheral device control apparatus 100. The CPU 101 knows respective names and locations of various keys provided on remote controller B.

The keys of remote controllers A and B, displayed on the "remote controller A" and "remote controller B" sections of the operation table input screen, are each in the form of an icon. The user can copy any desired one of the keys on remote controller A to a section "Manipulation of Remote Controller A" through drag and drop operation by the mouse pointer. Also, the user can find one of the keys of remote controller B, which is to be associated with the copied key, and copy that key of the remote controller to a section "Manipulation of Remote Controller B" through drag and drop operation by the mouse pointer. Thus, the CPU 101 can build a signal generation rule that, when the key of remote controller B, copied to the "Manipulation of Remote Controller B" section, has been operated, an IR code should be generated for the key of remote controller A copied to the "Manipulation of Remote Controller A" section.

Further, on a section "Operation Mode" of the operation table input screen are displayed various operation modes, such as an "Input=Tuner" mode, are displayed along with check boxes. The user can place a check mark in the check box of any desired one of the operation modes by manipulating the mouse. Signal generation rules built on the basis of the "Manipulation of Remote Controller A" and "Manipulation of Remote Controller B" sections are applied to the thus-checked operation mode.

By thus copying desired keys to the "Manipulation of Remote Controller A" and "Manipulation of Remote Controller B" sections and placing a check mark in the check box of the operation mode, it is possible to generate content of the operation mode which comprises the signal generation rule and operation mode the signal generation rule is to be applied to, like those having been described above in relation to the first embodiment.

The various keys of remote controller B may include a key for shifting the operation mode of the peripheral device control apparatus, like the INPUT key provided in the first embodiment. If such an operation mode shift key has been copied to the "Manipulation for the Remote Controller B" section, the user enters, in a section "Shifted-to Operation Mode", a desired shifted-to operation mode, such as the "Input=DVD" mode, in addition to placing a check mark in the check box of the operation mode. In an alternative, a pull-down menu of the operation modes may be displayed as the "Shifted-to Operation Mode" is clicked on so that the user can select any one of the operation modes from the displayed pull-down menu.

When the information pertaining to the shifted-to operation mode has been input in addition to the information for building the signal generation rule and information designating an operation mode to which the signal generation rule is to be applied to, the CPU 101 generates information indicative of a set of the signal generation rule, operation mode to which the signal generation rule is to be applied and shifted-to operation mode, and then the CPU 101 writes the thus-generated information to the operation table.

On a section "Instruction Manual of the Remote Controller A" of the operation table input screen is displayed, in text form, an instruction manual of the remote controller for the peripheral device designated by the user. The user can create the operation table while reading the instruction manual by scrolling the text through manipulation of the operation section 103. Also, by manipulating the operation section 103, the user can copy any desired words in the instruction manual, paste the words to a section "Explanation:" of the operation table, and revise or change the pasted words as desired. Through such operation, the user can place an explanatory statement of a desired operational item, e.g. "turn up the volume" in the "Explanation:" section. The explanatory statement of the desired operational item is stored into the storage section 109 in association with the set of the signal generation rule, operation mode to which the signal generation rule is to be applied and shifted-to operation mode (only when necessary).

In a preferred implementation, the CPU 101 causes the display section 102 to display a list representative of the set of the signal generation rule, operation mode to which the signal generation rule is to be applied and shifted-to operation mode, in response to a request by the user. From the displayed list, the user can confirm the contents of the operation table.

In another preferred implementation, a printer is connected to the peripheral device control apparatus 100. In response to a request by the user, the CPU 101 causes the printer to print a set of the explanatory statement of the desired operational item stored in the storage section 109, key name of remote controller B included in the signal generation rule associated with the explanatory statement, operation mode to which the signal generation rule is to be applied and shifted-to operation mode (only when necessary). Printing obtained in this manner has a utility value as an instruction manual of remote controller B for remote-controlling any one of the peripheral devices 200.

Third Embodiment

If the group of peripheral devices 200 constitutes an audio system comprising several audio devices, such as a tuner, DVD device and CD device, connected to a signal amplifier as in the above-described first embodiment, it may be relatively easy to assume all operation modes that can be taken by the peripheral device control apparatus 100. However, if the group of peripheral devices 200 constitutes an audio system comprising a number of audio devices connected with one another in a complicated manner, assuming all operation modes that can be taken by the peripheral device control apparatus 100 tends to be a difficult operation. Thus, a third embodiment of the present invention provides a system equipped with a function to assist the "operation mode assumption operation". In the server 400 shown in FIG. 1, there are stored various data as described above in relation to the first and second embodiments, as well as an operation mode database. The operation mode database is a collection of operation mode files corresponding to different assumed states of connection (i.e., connecting states) among a plurality of types of peripheral devices. In each of the operation mode files corresponding to the assumed connecting states, there is defined all operation modes that can be taken by the third embodiment of the peripheral device control apparatus 100. The third embodiment of the peripheral device control apparatus 100 is constructed in essentially the same manner as illustrated in FIG. 4; however, it is preferable that the third embodiment employ a touch panel in place of the operation section 103 and display section 102 of FIG. 4.

Figure 10:
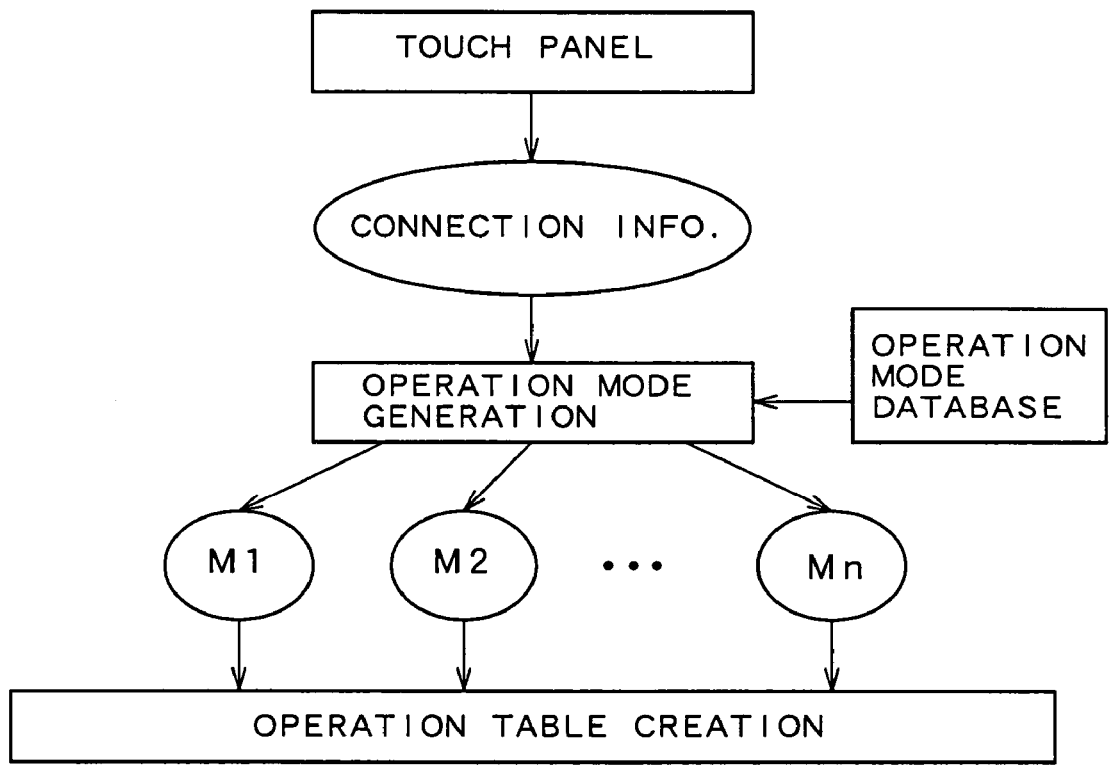
FIG. 10 is a block diagram showing various functions performed in a third embodiment of the peripheral device control apparatus.
Figure 11:
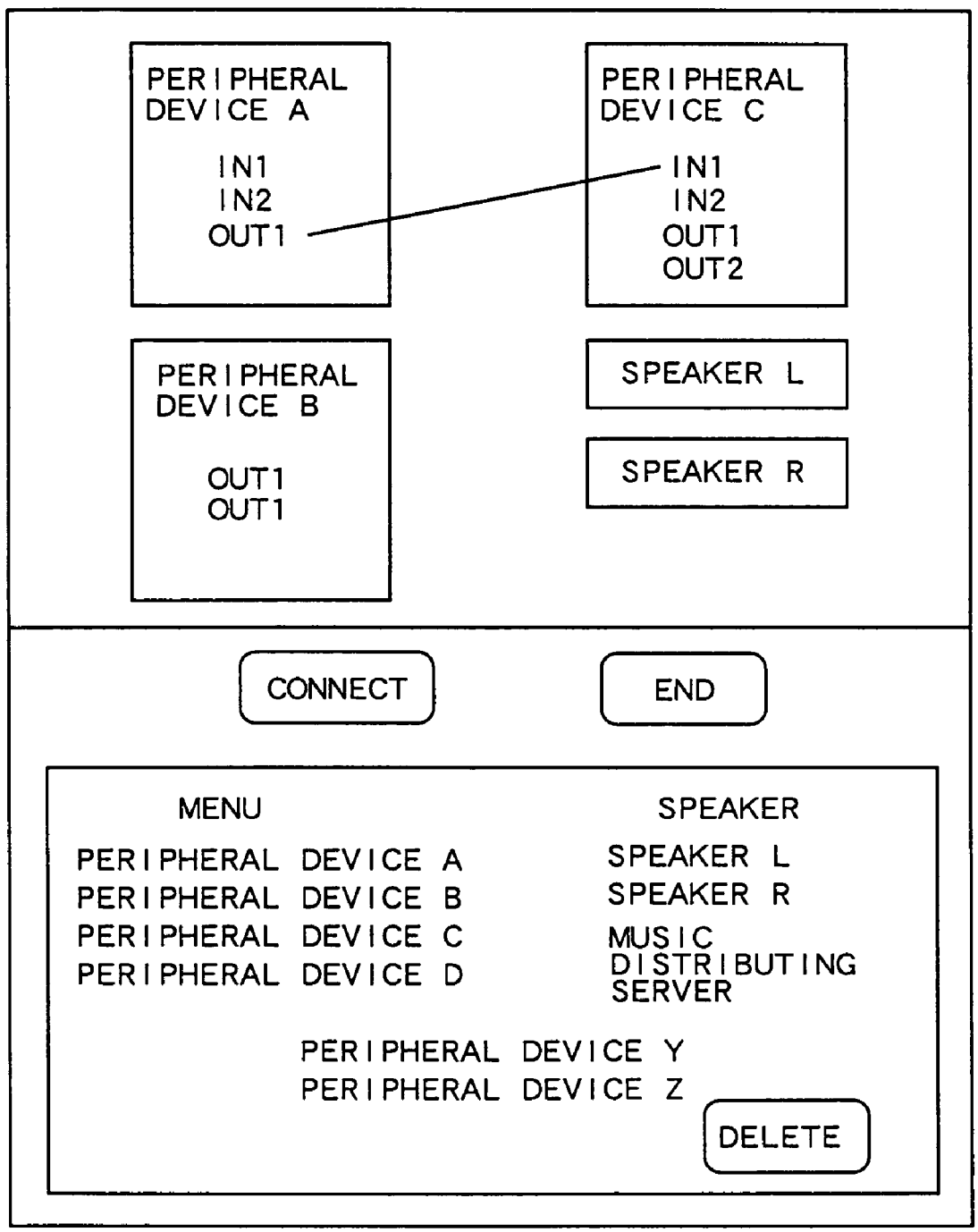
FIG. 11 is a diagram showing a connection information input screen displayed in the third embodiment.

FIG. 10 is a block diagram showing various functions performed by the CPU 101 in the third embodiment. Once the user performs predetermined operation on the touch panel, the CPU 101 causes the touch panel to display a connection information input screen as illustrated in FIG. 11. On the connection information input screen are displayed a menu of various peripheral devices 200 to be controlled by the peripheral device control apparatus 100, and a menu of other devices, such as a speaker and music distributing server, that are not to be controlled by the peripheral device control apparatus 100. Once the user touches a desired one of the devices on the displayed menus, the CPU 101 downloads, from the server 400, information indicative of the name of the user-touched device and information about an input or output terminal of the user-touched device, generates a symbol image on the basis of the downloaded information, and displays the symbol image on an upper half, working area of the connection information input screen. FIG. 11 illustrates an example of the connection information input screen when the user has touched peripheral device A, peripheral device B, peripheral device C, speaker L and speaker R on the displayed menu. If the user wants to delete peripheral device B from the displayed connection information input screen, it is only necessary for the user to touch the symbol image of peripheral device B and then touch a DELETE button in a menu section.

Each of the symbol images of the peripheral devices has software buttons representative of input and/or output terminals of the peripheral device. With all of the symbol buttons of the necessary peripheral devices displayed in the above-described manner, peripheral device connection information can be sequentially generated by the user sequentially touching the input or output terminal of each desired peripheral device and then touching a "CONNECT" software button. For example, if the user touches the "OUT1" software button representative of the output terminal of peripheral device A and "IN1" software button representative of one of the input terminals of peripheral device C and then touches the "CONNECT" software button, the CPU 101 generates peripheral device connection information indicating that the output terminal OUT1 of peripheral device A and the input terminal IN1 of peripheral device C are connected with each other. If the output terminal OUT1 of peripheral device B is connected with speaker L, the user only has to touch the "OUT1" software button of peripheral device B and software button "Speaker L" and then touch the "CONNECT" software button. The user can repeat such touch operation while ascertaining actual connecting states among the peripheral devices 200. Once the entry of all of the peripheral device connection information has been completed, the user touches an "END" software button, in response to which the CPU 101 transmits, to the server 400, a series of the peripheral device connection information having been generated so far. Using the series of the peripheral device connection information as a search key, the server 400 searches through the operation mode database. Once an operation mode file corresponding to the connecting states determined by the series of the peripheral device connection information is found or searched out, the server 400 returns the searched-out operation mode file to the peripheral device control apparatus 100. In turn, the CPU 101 stores the operation mode file into the storage section 109. In the operation mode file, there are defined all operation modes M1-Mn that can be taken by the peripheral device control apparatus 100 under the connecting states of the peripheral devices represented by the user-input peripheral device connection information.

Then, once the user performs predetermined operation on the touch panel, the CPU 101 causes the touch panel to display the operation table input screen as illustrated in FIG. 9. In this case, the individual operation modes, defined in the operation mode file received from the server 400, are displayed on a section "Operation Mode" of the operation table input screen. The user can enter information necessary for creation of the operation table, by selecting an appropriate one of the operation modes. Behavior of the peripheral device control apparatus 100 during that time is similar to the one described above in relation to the second embodiment and hence will not be described here to avoid unnecessary duplication.

Other Embodiments

Whereas only representative preferred embodiments of the present invention have been set forth above, various other embodiments of the invention are also possible, as stated below.

(1) Although the first embodiment has been described in relation to the case where the peripheral devices 200 are an amplifier, tuner, DVD device and CD device, the peripheral devices 200 may be any desired devices as long as they are remotely controllable via remote controllers. For example, a karaoke device may be added to the group of peripheral devices 200. Remote controller for the karaoke device is arranged to transmit an IR code requesting a reservation of a desired music piece, in response to the user, for example, depressing numeric keys representative of a unique number of the desired music piece, depressing a memory set key and then depressing a transmission key. If a generation rule for generating an IR code in response to user's operation of these keys is defined in advance in the operation table, then the karaoke device can be readily set as an object to be controlled by the peripheral device control apparatus of the present invention.

(2) Each of the above-described embodiments employs, as a means for transmitting a remote control signal, the infrared ray generation section that transmits an infrared ray signal, i.e. radio or wireless signal, to any one of the peripheral devices. In an alternative, however, each of the peripheral devices may be equipped with a communication function using a wireless LAN so that a remote control signal can be transmitted from the peripheral device control apparatus of the invention, via the wireless LAN, to the peripheral device. In another alternative, each of the peripheral devices may be provided with an input terminal for receiving a remote control signal via a bus; in this case, the respective input terminals of a plurality of the peripheral devices may be connected to the bus, and the transmission means of the peripheral device control apparatus of the present invention may output the remote control signal to the bus.

What is claimed is:

1. A remote control system comprising:
   a remote controller that generates and transmits a first operation signal using a wireless transmission medium;
   a group of peripheral devices physically separate from the remote controller at a location unable to receive the operation signal from the remote controller;
   a peripheral device control apparatus that includes:
      a storage section that stores a plurality of operation tables, each indicative of operational content for remote-controlling a desired peripheral device in response to said first operation signal, in association with a plurality of operation modes and also stores a current operation mode;
      an interface through which a plurality of control information including model name information are downloaded and stored in said storage section;
      an input section adapted to receive said first operation signal and a second operation signal from a controller device other than said remote controller;
      a control section that performs remote control, corresponding to the operation signal received via said input section, on the desired peripheral device as follows:
         (a) in a first mode whereby the first operation signal received is processed in accordance with the operation table corresponding to the current operation mode among the plurality of operation tables stored in said storage section; and wherein said signal generation section generates and transmits a remote control signal to the desired peripheral device, wherein said storage section further stores peripheral device control information related to remote control signals receivable by various types of peripheral devices, and wherein, when a remote control signal to be transmitted to the desired peripheral device is designated, in association with the first operation signal received via said input section, in the operation table corresponding to the current operation mode among the plurality of operation table stored in said storage section, said control section performs control to cause said signal generation section to generate the remote control signal on the basis of the peripheral device control information stored in said storage section; and
         (b) in a second mode whereby the second operation signal received is output directly to a signal generation section and wherein said signal generation section transmits a remote control signal to the desired peripheral device.

2. A remote control system as claimed in claim 1 which further comprises a communication section, and
   wherein said control section downloads the peripheral device control information from a server via said communication section and stores the downloaded peripheral device control information into said storage section.

3. A remote control system as claimed in claim 1 wherein, when a change in the operation mode is instructed, as a change in the operational content responsive to the first operation signal received via said input section, in the operation table corresponding to the current operation mode among the plurality of operation table stored in said storage section, said control section changes the operation mode to be stored in said storage section, in accordance with the instructed change in the operation mode.

4. A peripheral device control apparatus comprising:
   an input section, wherein said input section includes a wireless signal reception section that receives a first operation signal from a remote controller and a second operation signal from a controller device other than said remote controller;
   a storage section that stores a plurality of operation tables, each indicative of operational content for remote-controlling a desired peripheral device in response to said first operation signal, in association with a plurality of operation modes and also stores a current operation mode;
   an interface through which a plurality of control information including model name information are downloaded and stored in said storage section;
   a control section that performs remote control, corresponding to the operation signal received via said input section, on the desired peripheral device as follows:

(a) in a first mode whereby the first operation signal received is processed in accordance with the operation table corresponding to the current operation mode among the plurality of operation tables stored in said storage section; and wherein said signal generation section generates and transmits a remote control signal to the desired peripheral device, wherein said storage section further stores peripheral device control information related to remote control signals receivable by various types of peripheral devices, and wherein, when a remote control signal to be transmitted to the desired peripheral device is designated, in association with the first operation signal received via said input section, in the operation table corresponding to the current operation mode among the plurality of operation table stored in said storage section, said control section performs control to cause said signal generation section to generate the remote control signal on the basis of the peripheral device control information stored in said storage section; and (b) in a second mode whereby the second operation signal received is output directly to a signal generation section and wherein said signal generation section transmits a remote control signal to the desired peripheral device.

5. A remote control system comprising:
a remote controller that generates and transmits a first operation signal using a wireless transmission medium;
a group of peripheral devices physically separate from the remote controller at a location unable to receive the operation signal from the remote controller;
a peripheral device control apparatus that includes:
storage means for storing a plurality of operation tables, each indicative of operational content for remote-controlling a desired peripheral device in response to the first operation signal, in association with a plurality of operation modes and also for storing a current operation mode;
an interface through which a plurality of control information including model name information are downloaded and stored in said storage section;
input means capable of receiving said first operation signal and capable of receiving a second operation signal from a controller device other than said remote controller;
control means for performing remote control, corresponding to the operation signal received via said input means, on the desired peripheral device as follows:
(a) in a first mode whereby the first operation signal is processed in accordance with the operation table corresponding to the current operation mode among the plurality of operation table stored in said storage means; and wherein said signal generation section generates and transmits a remote control signal, wherein said storage means further stores peripheral device control information related to remote control signals receivable by various types of peripheral devices, and wherein, when a remote control signal to be transmitted to a desired peripheral device is designated, in association with the first operation signal received via said input means, in the operation table corresponding to the current operation mode among the plurality of operation table stored in said storage means, said control means performs control to cause said signal generation means to generate the remote control signal on the basis of the peripheral device control information stored in said storage means; and (b) in a second mode whereby the second operation signal is output directly to a signal generation section and wherein said signal generation section transmits a remote control signal to the desired peripheral device.

6. A remote control system as claimed in claim 5 which further comprises communication means, and
wherein said control means downloads the peripheral device control information from a server via said communication means and stores the downloaded peripheral device control information into said storage means.

7. A remote control system as claimed in claim 5 wherein, when a change in the operation mode is instructed, as a change in the operational content responsive to the first operation signal received via said input means, in the operation table corresponding to the current operation mode among the plurality of operation table stored in said storage means, said control means changes the operation mode to be stored in said storage means, in accordance with the instructed change in the operation mode.

8. A peripheral device control apparatus comprising:
input means, wherein said input means includes wireless signal reception means for receiving a first operation signal from a remote controller and a second operation signal from a controller device other than said remote controller;
storage means for storing a plurality of operation tables, each indicative of operational content for remote-controlling a desired peripheral device in response to the first operation signal, in association with a plurality of operation modes and also for storing a current operation mode;
an interface through which a plurality of control information including model name information are downloaded and stored in said storage section;
control means for performing remote control, corresponding to the operation signal received via said input means, on the desired peripheral device as follows:
(a) in a first mode whereby the first operation signal received is processed in accordance with the operation table corresponding to the current operation mode among the plurality of operation table stored in said storage means; and wherein said signal generation section generates and transmits a remote control signal, wherein said storage means further stores peripheral device control information related to remote control signals receivable by various types of peripheral devices, and wherein, when a remote control signal to be transmitted to a desired peripheral device is designated, in association with the first operation signal received via said input means, in the operation table corresponding to the current operation mode among the plurality of operation table stored in said storage means, said control means performs control to cause said signal generation means to generate the remote control signal on the basis of the peripheral device control information stored in said storage means; and (b) in a second mode whereby the second operation signal received is output directly to a signal generation section and wherein said signal generation section transmits a remote control signal to the desired peripheral device.

9. The remote control system of claim 1 or 5 wherein said interface is adapted for coupling to a server to effect downloading of said plurality of control information including model name information.

10. The apparatus of claim 4 or 8 wherein said interface is adapted for coupling to a server to effect downloading of said plurality of control information including model name information.

* * * * *